US 6,745,795 B2

(12) United States Patent
McGivery

(10) Patent No.: US 6,745,795 B2
(45) Date of Patent: Jun. 8, 2004

(54) METHOD AND DEVICE FOR PLUGGING A GAS MAIN

(75) Inventor: John W. McGivery, Scarborough (CA)

(73) Assignee: Enbridge Gas Distribution Inc., North York (CA)

( * ) Notice: Subject to any disclaimer, the term of this patent is extended or adjusted under 35 U.S.C. 154(b) by 0 days.

(21) Appl. No.: 10/300,626

(22) Filed: Nov. 21, 2002

(65) Prior Publication Data

US 2003/0098080 A1 May 29, 2003

(30) Foreign Application Priority Data

Nov. 23, 2001 (CA) .............................. 2363764
Feb. 5, 2002 (CA) .............................. 2370729

(51) Int. Cl.[7] ............................................... F16L 55/12
(52) U.S. Cl. .......................... 138/89; 138/93; 137/318; 137/15.15; 137/15.08; 174/77 R
(58) Field of Search ........................ 138/89, 90, 93; 137/317, 318, 599.11, 15.08, 15.14, 15.15; 277/621; 220/235, 237; 174/77 R, 151

(56) References Cited

U.S. PATENT DOCUMENTS

| 1,997,878 A | | 4/1935 | Wagner ........................ 137/76 |
| 2,002,383 A | * | 5/1935 | Witt ........................ 137/15.08 |
| 2,390,461 A | * | 12/1945 | Racz ........................... 138/89 |
| 2,977,992 A | * | 4/1961 | Jensen .......................... 138/89 |
| 3,485,118 A | | 12/1969 | Maughan, Jr. ............... 81/125 |
| 4,267,401 A | | 5/1981 | Wilkinson ................... 174/77 |
| 5,038,818 A | * | 8/1991 | Jiles ............................ 137/317 |
| 5,054,512 A | | 10/1991 | Jiles ............................ 137/317 |
| 5,224,516 A | * | 7/1993 | McGovern et al. ........... 138/97 |
| 5,235,138 A | | 8/1993 | Shah et al. ................... 174/151 |
| 5,778,919 A | * | 7/1998 | Petrone ..................... 137/15.08 |
| 5,797,431 A | | 8/1998 | Adams ......................... 138/89 |
| 6,135,140 A | | 10/2000 | Grandinetti ................. 137/362 |

FOREIGN PATENT DOCUMENTS

| CA | 676280 | 12/1963 | ................... 189/11 |
| CA | 1082620 | 7/1980 | ........... F16L/57/00 |
| CA | 1191462 | 8/1985 | ........... F16L/55/136 |
| CA | 2220205 | 11/1998 | ........... F16L/55/136 |
| FR | 2 553 687 | 4/1985 | ........... B23B/41/08 |
| WO | WO 97/48931 | 12/1997 | ............. F16L/5/02 |

* cited by examiner

Primary Examiner—Patrick Brinson
(74) Attorney, Agent, or Firm—Dimock Stratton LLP; Mark B. Eisen

(57) ABSTRACT

A method of sealing a pipe and a device for sealing the pipe which prevents gas leakage out of a pipe stub plugged by a stopper disposed in a tee fitting, to allow a permanent cap to be welded onto the pipe. The device comprises an expandable plug comprising a pair of plates with a sealing member disposed between the plates. The plates can be squeezed together, for example by tightening nuts onto bolts extending through the plates to compress the sealing member and cause the periphery of the sealing member to expand against the inner wall of the pipe. Stabilizing means, for example a nut having a reverse thread and a complimentary tool, is provided for stabilizing the expandable plug radially within the pipe as the plates are squeezed together. The expandable plug is inserted into the pipe stub after the bypassed section of pipe has been removed, and lodged in the pipe by squeezing the plates together to expand the sealing member against the inner wall of the pipe stub. The cap is then welded onto the pipe stub.

10 Claims, 5 Drawing Sheets

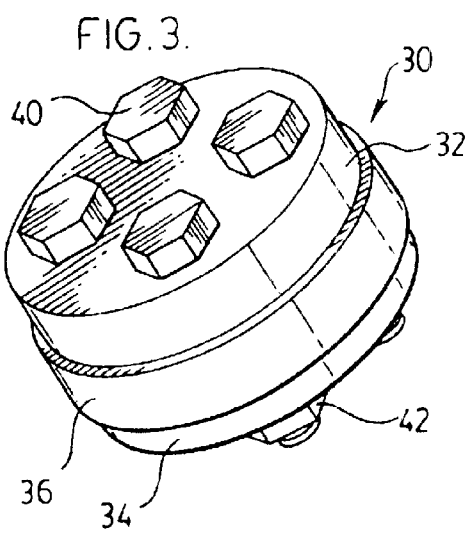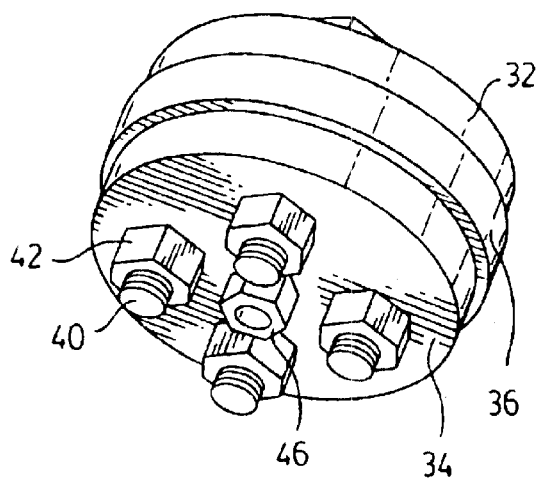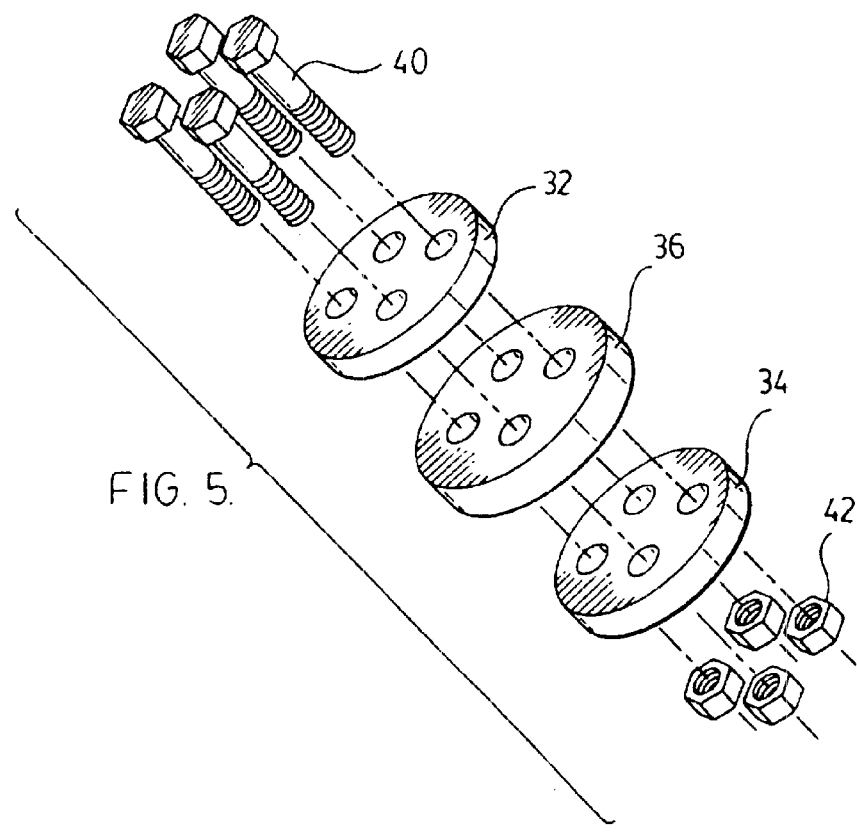

METHOD AND DEVICE FOR PLUGGING A GAS MAIN

FIELD OF THE INVENTION

This invention relates to pipe repair and installation procedures. In particular, this invention relates to a method and device for facilitating the welding of a permanent cap onto a pipe, for example as part of a natural gas pipeline bypass procedure.

BACKGROUND OF THE INVENTION

Gas company crews are required on a routine basis to install bypasses on existing piping systems. In most cases bypasses are required as a result of pipeline relocations or damages to the pipeline caused by a third party such as a construction crew. While typically such bypasses involve relatively short pipe lengths, bypasses can involve very long pipe lengths, for example half a mile or more. It is costly and inconvenient to de-energize the entire pipeline for such a bypass procedure, and accordingly gas companies employ a "hot" tapping and plugging process on the live gas pipe in the bypass operation.

In a conventional gas pipe bypass operation, a "tee" fitting is secured to the live gas pipe and a stopper is lodged into the pipe through the tee fitting immediately adjacent to each end of the section of pipe to be bypassed. For example, the three-way tee fitting sold as "SHORTSTOPP" (trademark) manufactured by T. D. Williamson, Inc. is welded to the pipe exterior at each end of the section of pipe to be bypassed, and the bypass pipe is welded to the stem of the tee, as shown in FIG. 1. The SHORTSTOPP fitting is in turn fitted with a tap/stopper assembly, for example the valve fitting sold as "SHORTCUTT" (trademark) manufactured by T. D. Williamson, Inc., which provides a tap for cutting a coupon out of the pipe wall. Once the pipe has been tapped gas flows through the newly installed bypass pipe, and a stopper is lowered through the fitting and rotated into position to stop gas from flowing into the section of pipe to be bypassed (referred to herein as the "bypassed pipe section"). This allows the maintenance crew to work on the pipeline under live conditions, and avoids disruption of the gas service to downstream customers.

Once each end of the bypassed pipe section has been stopped, a venting system is installed adjacent to the tee fitting in the bypassed pipe section. For example, venting nipples are welded to the pipe and tested for pressure, then the pipe is tapped through the venting nipples, and venting valves are coupled to the venting nipples. The gas remaining in the bypassed pipe section is blown out through a conduit coupled to the venting system. The bypassed pipe section is then cut off, leaving a short pipe stub, as shown in FIG. 1. The seal provided by the tee fitting stopper is a temporary seal, and in order to complete the operation caps must be welded to the cut ends of the pipe stubs, which remain attached to the tee fitting.

However, the pressure in a live gas pipe can range from low to extra high, and on many occasions the tee fitting stoppers end up resting on cutting debris or an internal pipe seam, and do not provide a complete seal and gas leaks past the stoppers. Although this does not pose a safety hazard, because the gas leakage rate is generally fairly low, the leakage rate can be significant enough that it would be difficult to weld a permanent cap onto the cut ends of the pipe stubs. This is usually determined by the rate of gas flow out of the venting nipples after the bypassed pipe section has been blown out. The welder must judge, based on the rate at which gas is escaping from the venting nipples, whether the conditions are suitable for welding the permanent sealing caps. If the leakage through the tee fitting stopper is low enough, the welder may direct that the bypassed pipe section be cut off, inject an inert gas such as nitrogen into the pipe stub to expel as much natural gas and air as possible from the pipe stub, and then weld the cap. However, if too much gas is leaking through the tee fitting stoppers to weld the cap, the tee fitting stoppers must be reinstalled.

In these cases, the bypassed pipe section cannot be cut off, the system must be re-energized to equalize the pressure on both sides of the tee fitting stoppers so that the stoppers can be dislodged from the pipe and removed. New stoppers must be installed, and the bypassed pipe section blown out again. This adds significant costs to the operation, both direct and indirect. It is a time consuming and laborious process to re-energize the system, replace the stoppers and de-energize the system again. There are cost inefficiencies in the cost of lost gas from repeating the stopping procedure, sometimes multiple times, as well as the cost of the stoppers themselves (which according to the manufacturer's specifications cannot be reused once they have been removed), which can be in the order of hundreds of dollars per unit, depending upon the size of the pipe. There is also the cost of responding to and investigating notifications of a detected gas leak by neighbouring residents or occupants, who may detect the gas discharged into the air. In addition this poses an environmental hazard, because of the unnecessary release of natural gas into the surrounding environment.

SUMMARY OF THE INVENTION

The present invention overcomes these disadvantages by providing a method of sealing a pipe and a device for sealing the pipe which prevents any gas leakage out of the pipe stub remaining attached to the tee fitting of a bypassed pipe section, thus allowing a permanent cap to be welded onto the pipe without the use of nitrogen, and with no difficulties encountered by the welder due to the presence of gas. The method and device of the invention can virtually completely eliminate the failure rate of the temporary seals provided by conventional tee fitting stoppers, so the de-energizing procedure needs to be performed only once, thus avoiding the costs and hazards often associated with ineffective sealing by the tee fitting stoppers.

The invention accomplishes this by providing an expandable plug which provides a completely gas-free environment for welding the permanent cap, by preventing gas leaking through the tee fitting stopper from reaching the cut end of the pipe stub. In the preferred embodiment the plug comprises a pair of plates dimensioned to slide into the pipe, with a sealing member disposed between the plates. The plates are affixed together in a manner which allows them to be squeezed together, for example by tightening nuts onto bolts extending through the plates, such that compression of the sealing member by the plates causes the periphery of the sealing member to expand against the inner wall of the pipe. Stabilizing means, for example a nut having a reverse thread and a complimentary tool for engaging the stabilizing nut, is provided for orienting and stabilizing the expandable plug radially within the pipe as the plates are squeezed together.

The sealing member thus seals the pipe stub between the tee fitting and the cut end of the pipe stub, so that any gas leaking through the tee fitting stopper does not reach the cut end of the pipe stub and is vented out of the venting system. This allows the permanent cap to be effectively and efficiently welded onto the pipe stub to form a permanent seal.

According to the method of the invention, the expandable plug is inserted into the pipe stub after the bypassed pipe section has been removed, and lodged in the pipe stub by squeezing the plates together to expand the sealing member against the inner wall of the pipe stub. A hole is drilled between the expandable plug and the cut end of the pipe stub, so that as the cap is welded onto the pipe stub expanding air within the pipe stub can escape out of the vent hole until the cap weld is complete. The venting system and vent hole are sealed, the tee fitting stopper is removed, and the expandable plug remains in the pipe stub.

The method and device of the invention can save considerable costs and labour. The need to use nitrogen to displace gas leaking into the pipe stub is eliminated, and the permanent cap can be welded to the pipe stub without the need to repeat the stopping process because of leaking tee fitting stoppers.

The present invention thus provides an expandable plug for sealing a pipe, comprising a pair of plates configured for insertion into the pipe, a sealing member disposed between the plates, means for squeezing the plates together to compress the sealing member, and stabilizing means for stabilizing the plug within the pipe as the plates are squeezed together, whereby as the plates are squeezed together the sealing member expands in a radial direction such that a periphery of the sealing member engages an interior wall of the pipe.

The present invention further provides a method of sealing a pipe, comprising the steps of: a. coupling a fitting to the pipe; b. cutting a coupon out of the pipe at the fitting; c. engaging a stopper through the fitting into a position lodged in the pipe; d. cutting the pipe leaving a pipe stub coupled to the fitting; e. inserting into the pipe stub an expandable plug comprising a pair of plates configured for insertion into the pipe, a sealing member disposed between the plates, means for squeezing the plates together to compress the sealing member, and stabilizing means for stabilizing the plug within the pipe as the plates are squeezed together, whereby as the plates are squeezed together the sealing member expands in a radial direction such that a periphery of the sealing member engages an interior wall of the pipe; f. providing a vent hole for the venting of heated air from a portion of the pipe stub between the expandable plug and an open end of the pipe stub, and g. welding a permanent cap over an open end of the pipe stub.

The present invention further provides a method of bypassing a pipe section, comprising the steps of: a. coupling a tee fitting to each end of the pipe section; b. coupling a bypass pipe to each tee fitting; c. cutting a coupon out of the pipe section at each tee fitting; d. engaging a stopper through the tee fitting into a position lodged in the pipe section; e. cutting the pipe section leaving a pipe stub coupled to each tee fitting; f. inserting into each pipe stub an expandable plug comprising a pair of plates configured for insertion into the pipe, a sealing member disposed between the plates, means for squeezing the plates together to compress the sealing member, and stabilizing means for stabilizing the plug within the pipe as the plates are squeezed together, whereby as the plates are squeezed together the sealing member expands in a radial direction such that a periphery of the sealing member engages an interior wall of the pipe; g. providing a vent hole for the venting of heated air from a portion of the pipe stub between the expandable plug and an open end of the pipe stub, and h. welding a permanent cap over an open end of each pipe stub.

BRIEF DESCRIPTION OF THE DRAWINGS

In drawings which illustrate by way of example only a preferred embodiment of the invention, FIG. 3 is a perspective view of an expandable plug according to the invention, FIG. 4 is a perspective view of the expandable plug of FIG. 3, taken opposite FIG. 3, FIG. 5 is an exploded view of the expandable plug of FIG. 3.

DETAILED DESCRIPTION OF THE INVENTION

Figure 1:
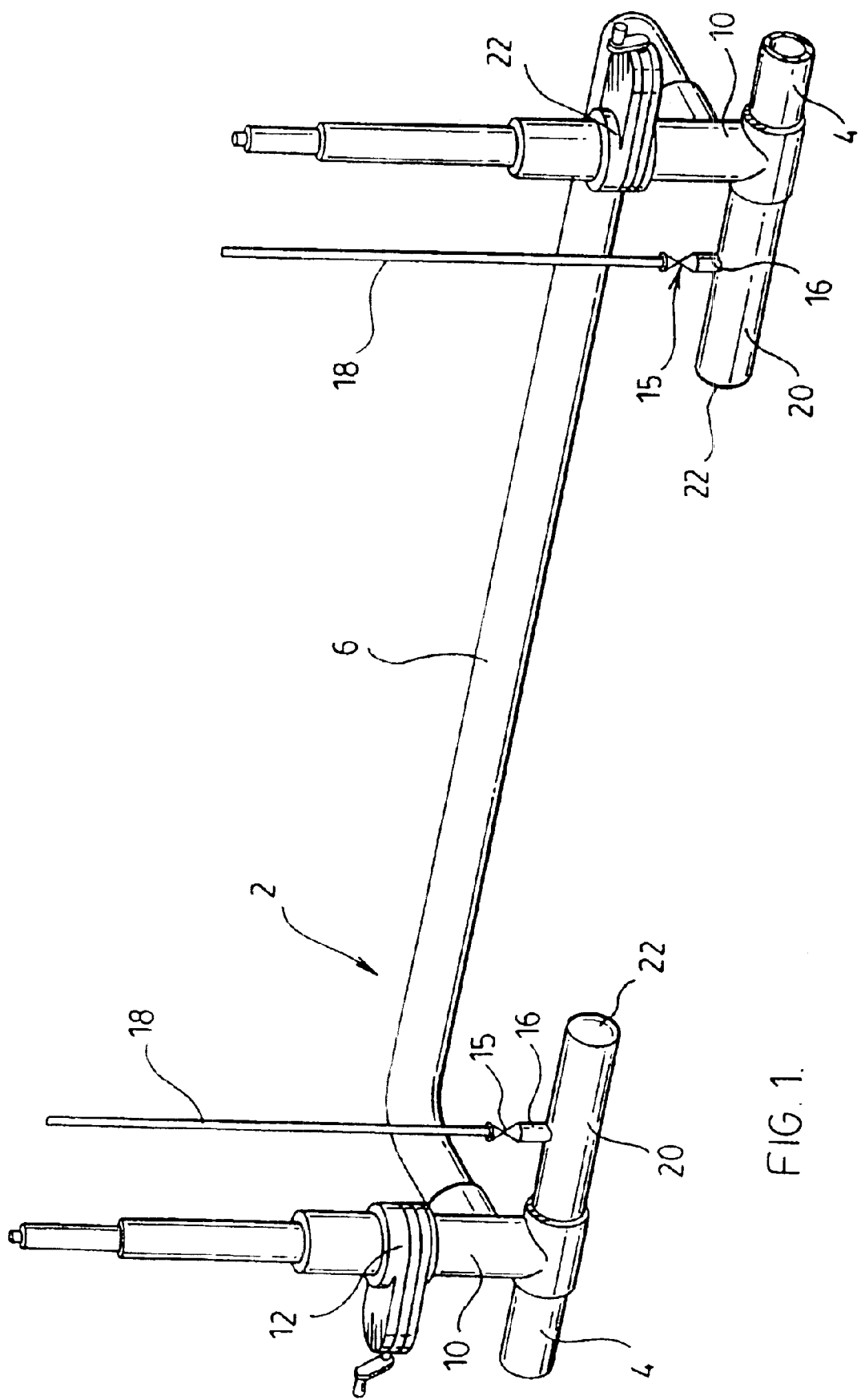
FIG. 1 is a perspective view of a gas pipeline after a bypass operation.

FIG. 1 illustrates a section of gas pipe 2 after a bypass operation. A three-way tee fitting 10 is secured to the live gas pipe 4, welded to the pipe exterior at each end of the bypassed section of pipe (not shown), and the bypass pipe 6 is welded to the stem of the tee in the tee fitting 10. The tee fitting 10 is fitted with a tap/stopper assembly 12, which provides a tap (not shown) for cutting a coupon out of the pipe wall. After both ends of the pipe 4 have been tapped gas flows through the bypass pipe 6. A pivotably-mounted stopper 14 (shown in FIG. 2) is lowered through the tee fitting 10 and rotated into a position lodged in the pipe 4, to stop gas from flowing into the bypassed section. Once each end of the bypassed section has been plugged by a stopper 14, a venting system is installed adjacent to the tee fitting in the bypassed pipe section. For example, venting nipples 16 are welded to the pipe and tested for pressure, then the pipe is tapped through the venting nipples 16, and venting valves 15 are coupled to the venting nipples 16. The gas remaining in the bypassed section is blown out conventional fashion through conduits 18 coupled to the venting valves 15. The bypassed section of pipe is then cut off, leaving a pipe stub 20. The process of installing a bypass onto a pipe 4 described thus far is conventional and well known to those skilled in the art.

Figure 2:
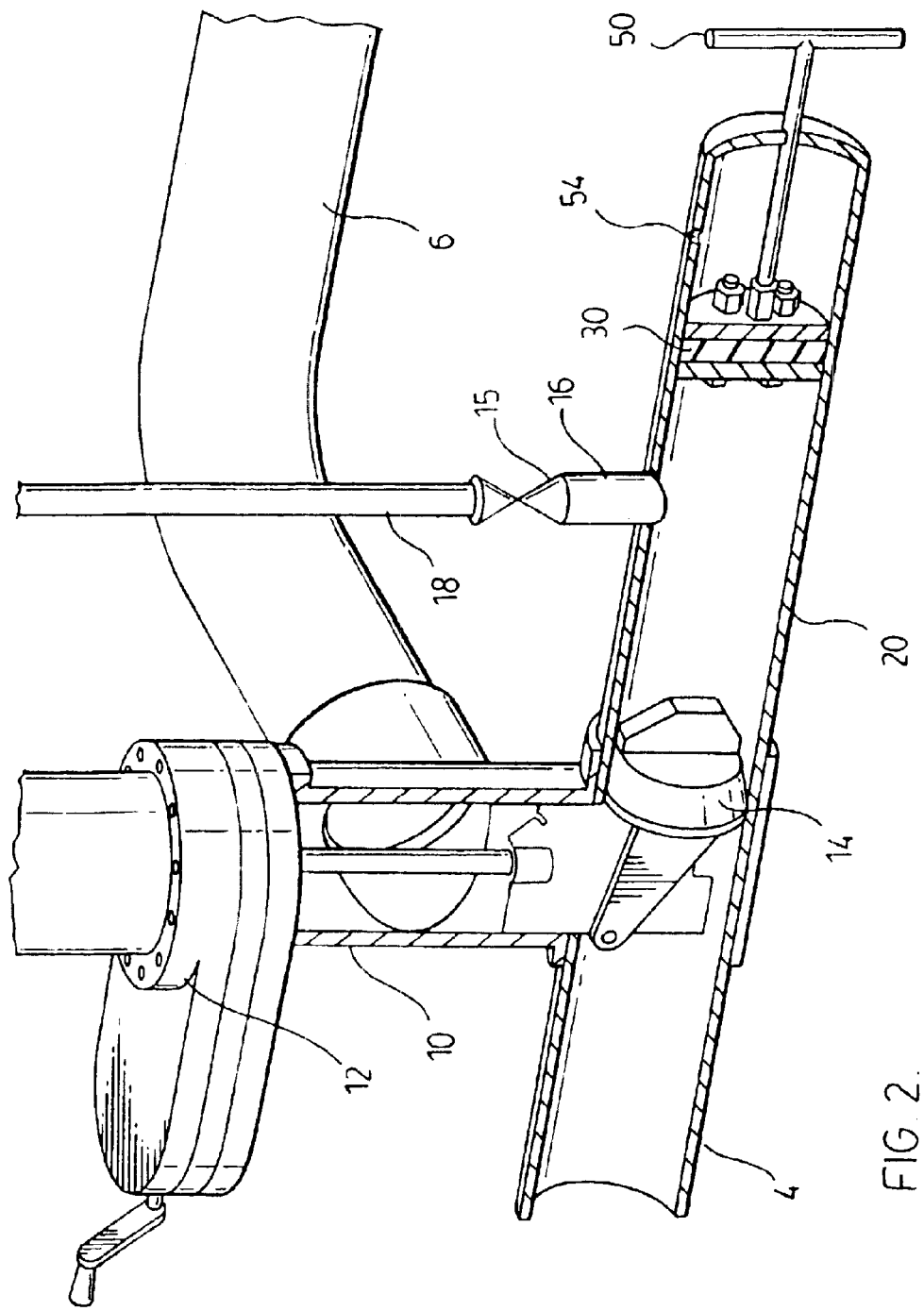
FIG. 2 is a partially cutaway perspective view of a gas pipeline during a bypass operation utilizing the method and device of the invention.

The present invention provides a method of sealing a pipe and a device for sealing the pipe which completely prevents any gas leakage out of the pipe stubs remaining attached to the tee fitting of a bypassed pipe section, to facilitate the welding of permanent caps 22 to the pipe stubs 20. The invention provides an expandable plug 30, illustrated in FIGS. 2 to 5, which is positioned and lodged in the pipe stub 20 as shown in FIG. 2, to thus serve as a secondary stopper which prevents gas leaking through the tee fitting stopper 14 from reaching the cut end of the pipe stub 20.

In one preferred embodiment, illustrated in FIGS. 3 to 5, the expandable plug 30 comprises a pair of plates 32, 34, formed of steel or another suitable material which will not melt under the heat of the welding torch or deform under the squeezing pressure described below. The plates 32, 34 are dimensioned to slide into the pipe 4, and preferably configured with a close tolerance to the inside diameter of the pipe 4.

A sealing member 36 is disposed between the plates 32, 34. The sealing member 36 is also configured with a close tolerance to the inside diameter of the pipe 4 when in the relaxed condition. The sealing member is composed of a material which, when compressed in one direction, will expand in another direction. In particular, when the plates 32, 34 are squeezed together to compress the sealing member 36 axially, the sealing member responds by expanding radially. Rubber is a particularly suitable material for the sealing member 36, however other materials are also suitable and the invention is not intended to be limited in this respect.

The plates 32, 34 are affixed together in a manner which allows them to be squeezed together. In the preferred embodiment illustrated, bolts 40 are welded to the plate 32 and extend through the sealing member 36 and the other plate 34, and nuts 42 are engaged to the bolts 40 so that tightening the nuts 42 on the bolts 40 compresses the sealing member 36 between the plates 32, 34. This in turn causes the periphery of the sealing member 36 to expand against the inner wall of the pipe stub 20, sealing the pipe stub 20 and containing any gas leaking through the tee fitting stopper 14 to the section of the pipe stub 20 between the tee fitting stopper 14 and the expandable plug 30.

Stabilizing means is provided to orient the expandable plug 30 within the pipe stub 20 and stabilize the expanding plug 30 in a substantially radial orientation while the nuts 42 are tightened on the bolts 40. In the preferred embodiment the stabilizing means comprises a nut 46 having a thread with a reverse pitch relative to the pitch of the thread in the nuts 42, and a complimentary tool 50 (shown in FIG. 2) having a threaded end which engages the nut 46. It will be appreciated that the stabilizing means may instead comprise another type of engaging means, for example a bayonet fitting and complimentary receptacle welded or otherwise affixed to the plate 34, or another suitable means of stabilizing the expandable plug 30 in the pipe stub 20 through the cut end of the pipe stub 20, so that the expandable plug 30 does not twist or rotate while the nuts 42 are tightened on the bolts 40.

According to the method of the invention, after the bypassed pipe section has been removed the expandable plug 30, with nuts 42 threaded loosely onto bolts 40 and tool 50 securely engaged to the stabilizing nut 46, is manually inserted into the pipe stub 20 through the cut end of the pipe stub 20. The expandable plug 30 is then lodged in the pipe stub 20 by holding the expandable plug 30 in a substantially radial orientation within the pipe stub 20 as the nuts 42 are tightened to squeeze the plates 32, 34 together. This causes the sealing member 36 to expand against the inner wall of the pipe stub 20. Because the torque on the expandable plug 30 as the nuts 42 are tightened is in the tightening direction of the reverse-thread nut 46, the tool 50 remains securely fixed to the expandable plug 30 as it is lodged in the pipe stub 20.

After the expandable plug 30 has been lodged in the pipe stub 20, a vent hole 54 is drilled into the pipe at a position between the expandable plug 30 and the open end of the pipe stub 20, as shown in FIG. 2, because as the cap 22 is welded onto the pipe stub 20 any air between the expandable plug 30 and the open end of the pipe stub 20 will expand under the heat of the welding torch, and can thus can escape out of the vent hole 54. Once the cap 22 has been successfully welded onto the pipe stub 20, the vent hole 54 is sealed by inserting a steel pin, welding it to the pipe stub 20 and cutting off the excess. The pipe stubs 20 are pressurized though the venting system so that the tee fitting stopper 14 can be dislodged and removed from the pipe 4, and the expandable plug 30 remains in the pipe stub 20. The tap/stopper assembly 12 can then be removed and the tee fitting 10 and venting system sealed in conventional fashion.

Figure 6:
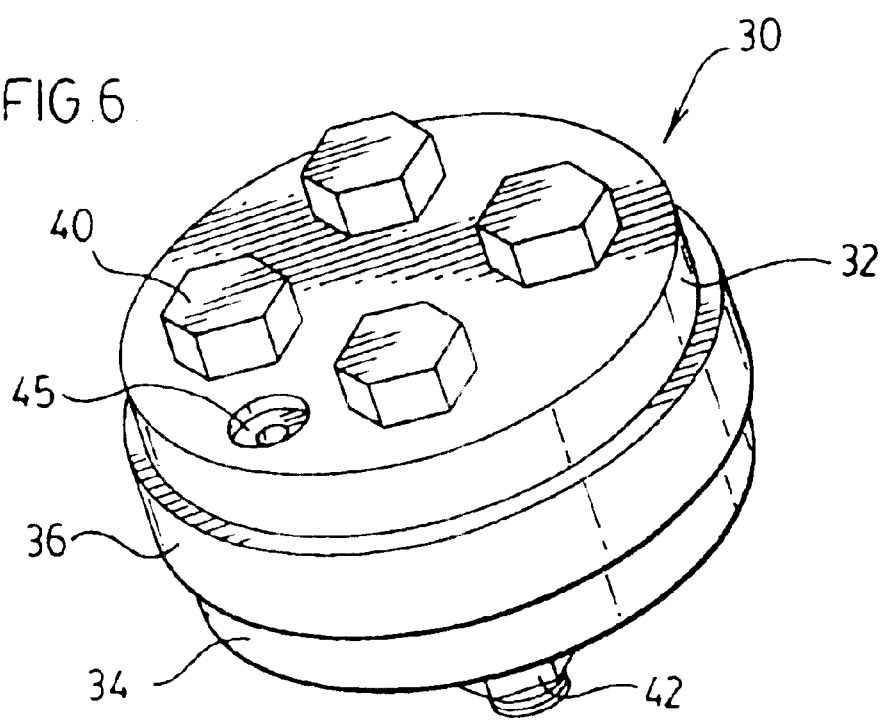
FIG. 6 is a perspective view of a further embodiment of the expandable plug according to the invention.
Figure 7:
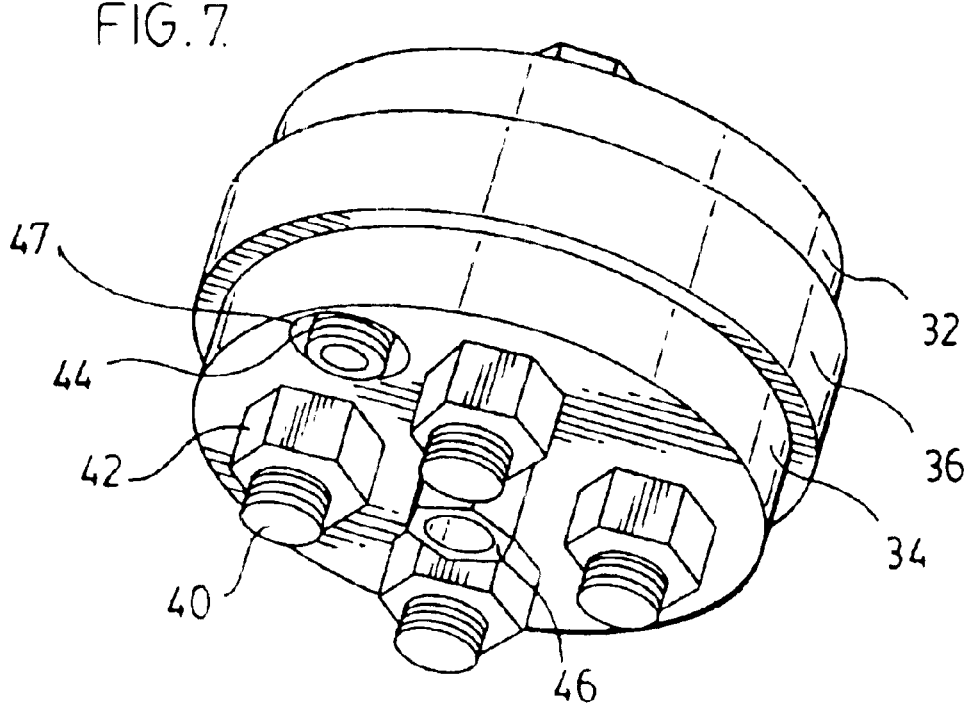
FIG. 7 is a perspective view of the expandable plug of FIG. 6, taken opposite FIG. 6.
Figure 8:
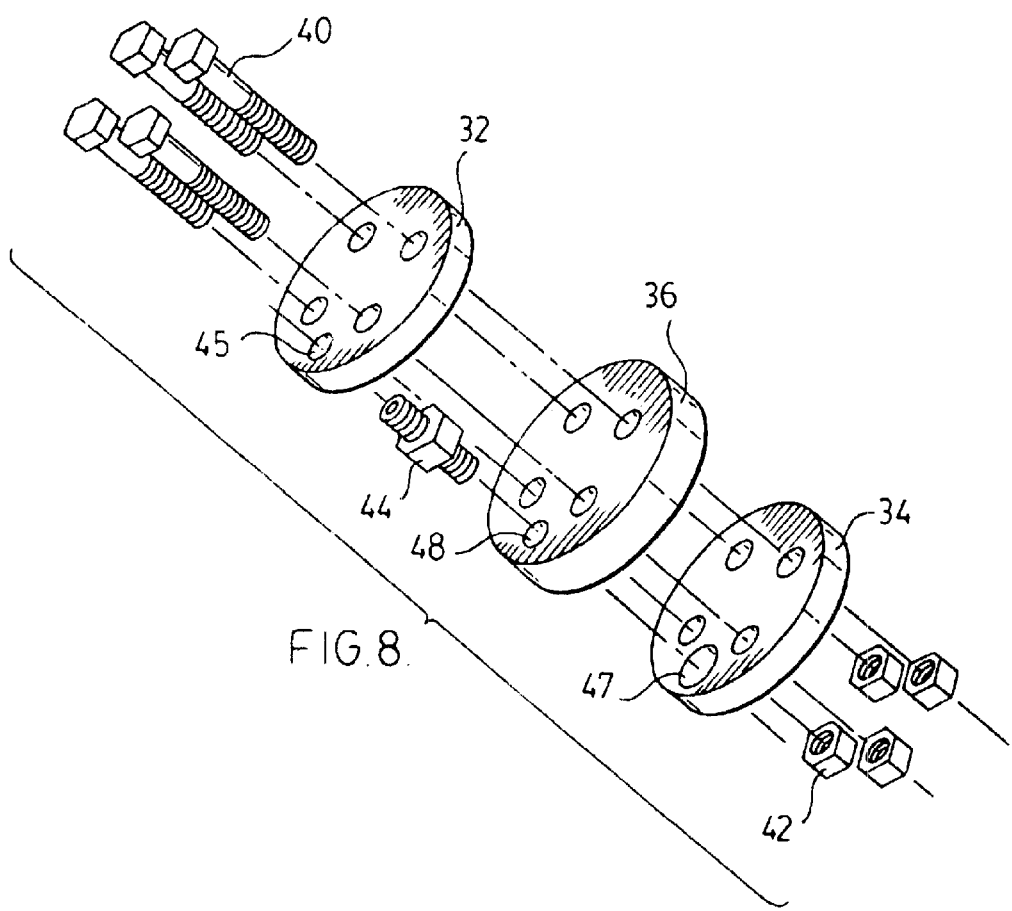
FIG. 8 is an exploded view of the expandable plug of FIG. 6.

If the plug 30 remains lodged in the pipe stub 20 after the tee fitting stopper 14 has been dislodged, there is the possibility that a leak in the gas cap 22 will go undetected during a leak test, because no gas can enter the pipe stub 20 while the plug 30 is in position blocking the gas flow. In a further embodiment of the invention, illustrated in FIGS. 6 to 8, a check relief valve 44 is provided in the plug 30, disposed through aligned openings 45, 47 respectively provided in the plates 32, 34 and an opening 48 in the sealing member 36. The check relief valve 44 allows gas to flow in only one direction, i.e. the direction from the plate 32 to the plate 34. Preferably one to two lbs. of pressure is required to open the valve 44, so that any small amount of gas leaking past the tee fitting stopper 14 does not have sufficient pressure to open the valve 44 and thus remains confined behind the stopper 14. Thus, in this embodiment, after the cap 22 has been welded to the pipe stub 20 and the tee fitting stopper 14 has been dislodged, the pressure of gas entering the pipe stub 20 opens the check relief valve 44, which causes the pressure to equalize on both sides of the plug 30. This can improve the reliability of the leak test on the cap 22, by ensuring that the gas reaches the cap 22 after the tee fitting stopper 14 has been removed.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. An expandable plug for sealing a pipe, comprising a pair of plates configured for insertion into the pipe, a sealing member disposed between the plates, means for squeezing the plates together to compress the sealing member, and stabilizing means for stabilizing the plug within the pipe as the plates are squeezed together, whereby as the plates are squeezed together the sealing member expands in a radial direction such that a periphery of the sealing member engages an interior wall of the pipe, and a passage through the plates and sealing member provided with a check relief valve that opens when the pipe is pressurized to a predetermined threshold pressure, so that gas flows through the plug to equalize the pressure on both sides of the plug when the pipe is pressurized to a predetermined threshold pressure.

2. A method of sealing a pipe, comprising the steps of:

a. coupling a fitting to the pipe;

b. cutting a coupon out of the pipe at the fitting;

c. engaging a stopper through the fitting into a position lodged in the pipe;

d. cutting the pipe leaving a pipe stub coupled to the fitting;

e. inserting into the pipe stub an expandable plug comprising a pair of plates configured for insertion into the pipe, a sealing member disposed between the plates, means for squeezing the plates together to compress the sealing member, and stabilizing means for stabilizing the plug within the pipe as the plates are squeezed together, whereby as the plates are squeezed together the sealing member expands in a radial direction such that a periphery of the sealing member engages an interior wall of the pipe;

f. providing a vent hole for the venting of heated air from a portion of the pipe stub between the expandable plug and an open end of the pipe stub, and g. welding a permanent cap over an open end of the pipe stub.

3. A method of bypassing a pipe section, comprising the steps of:

a. coupling a tee fitting to each end of the pipe section;

b. coupling a bypass pipe to each tee fitting;

c. cutting a coupon out of the pipe section at each tee fitting;

d. engaging a stopper through the tee fitting into a position lodged in the pipe section;

e. cutting the pipe section leaving a pipe stub coupled to each tee fitting;

f. inserting into each pipe stub an expandable plug comprising a pair of plates configured for insertion into the pipe, a sealing member disposed between the plates, means for squeezing the plates together to compress the sealing member, and stabilizing means for stabilizing the plug within the pipe as the plates are squeezed together, whereby as the plates are squeezed together the sealing member expands in a radial direction such that a periphery of the sealing member engages an interior wall of the pipe;

g. providing a vent hole for the venting of heated air from a portion of the pipe stub between the expandable plug and an open end of the pipe stub, and h. welding a permanent cap over the open end of each pipe stub.

4. The method of claim 3 comprising the step of disposing a hole adjacent to each fitting to empty the pipe section.

5. The method of claim 3 wherein the cap is welded to the pipe stub and comprising the step of disposing a hole between the expandable plug and the open end of the pipe stub to allow expanding air to vent out of the pipe stub.

6. The method of claim 3 wherein the expandable plug is provided with a check relief valve which allows gas to flow from the pipe section to the cap after the stopper is removed.

7. The plug of claim 1 wherein the means for squeezing the plates together comprises bolts engaging the plates and having a thread with a first pitch to which nuts are engaged, and wherein the stabilizing means comprises a threaded portion having a thread with a second pitch directed opposite to the first pitch.

8. An expandable plug for sealing a pipe, comprising a pair of plates configured for insertion into the pipe, a sealing member disposed between the plates, bolts engaging the plates and having a thread with a first pitch to which nuts are engaged for squeezing the plates together to compress the sealing member, and stabilizing means for stabilizing the plug within the pipe as the plates are squeezed together, comprising a threaded portion having a thread with a second pitch directed opposite to the first pitch, whereby as the plates are squeezed together by tightening the nuts the sealing member expands in a radial direction such that a periphery of the sealing member engages an interior wall of the pipe and a tool engaging the stabilizing means stabilizes the plug during tightening.

9. The plug of claim 8 further comprising a passage disposed through the plug, the passage allowing gas having a predetermined minimum pressure to flow through the plug while preventing gas having less than the predetermined minimum pressure from flowing through the plug.

10. The plug of claim 9 wherein the passage comprises a check relief valve.

* * * * *